(12) United States Patent
Bahl et al.

(10) Patent No.: US 7,440,754 B2
(45) Date of Patent: *Oct. 21, 2008

(54) SYSTEM AND METHOD FOR CONCURRENT OPERATION OF A WIRELESS DEVICE IN TWO DISJOINT WIRELESS NETWORKS

(75) Inventors: Pradeep Bahl, Redmond, WA (US); Paramvir Bahl, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 805 days.

This patent is subject to a terminal disclaimer.

(21) Appl. No.: 10/870,626

(22) Filed: Jun. 17, 2004

(65) Prior Publication Data

US 2004/0223469 A1    Nov. 11, 2004

Related U.S. Application Data

(63) Continuation of application No. 09/954,087, filed on Sep. 17, 2001, now Pat. No. 7,194,263.

(51) Int. Cl.
*H04Q 7/20* (2006.01)
*H04J 1/00* (2006.01)

(52) U.S. Cl. ............... 455/432.1; 455/426.1; 455/426.2

(58) Field of Classification Search ............... 455/432.1, 455/426.1, 435.2, 435.1; 370/480, 344, 343, 370/319, 449, 465, 489, 401, 254

See application file for complete search history.

(56) References Cited

U.S. PATENT DOCUMENTS 5,566,331 A    10/1996    Irwin, Jr. et al.

(Continued)

FOREIGN PATENT DOCUMENTS

EP    0597640 A1    5/1994

(Continued)

OTHER PUBLICATIONS

Evans et al. ; Wireless Local Area Network System; Sep. 10, 1999; WO99/45672.*

(Continued)

*Primary Examiner*—Melur Ramakrishnaiah
(74) *Attorney, Agent, or Firm*—Wolf, Greenfield & Sacks, P.C.

(57) ABSTRACT

A system and method for wireless network communications provides a "dual-mode" wireless device that operates concurrently as a member of two disjoint wireless networks, such as an infrastructure ("IS") network and an ad hoc ("AH") network. The dual-mode device has a wireless controller driver inserted in its networking stack (e.g., the stack comprising of the Network and NDIS drivers) that exposes two virtual wireless network adapters, one for the first wireless network and one for the second wireless network. Each virtual wireless network adapter has an associated queue for queuing packets in the flow for the corresponding wireless network mode. The wireless controller driver controls the switching of the network mode. In one embodiment where the two networks include an IS network and an AH network, the mode switching is triggered by poll signals transmitted by an access point of the IS network. When the mode is switched from operating in the first network to operating in the second network, the first virtual network adapter is disabled and the second virtual network adapter is enabled, and the queued packets in the queue for the second virtual network adapter are transmitted over the second wireless network.

18 Claims, 6 Drawing Sheets

U.S. PATENT DOCUMENTS

| | | | |
|---|---|---|---|
| 5,727,212 A | | 3/1998 | Dinallo |
| 5,815,682 A | | 9/1998 | Williams et al. |
| 5,881,372 A | * | 3/1999 | Kruys .................... 455/113 |
| 5,918,158 A | | 6/1999 | LaPorta et al. |
| 5,949,776 A | | 9/1999 | Mahany et al. |
| 6,041,075 A | | 3/2000 | Caushik |
| 6,202,147 B1 | | 3/2001 | Slaughter et al. |
| 6,219,707 B1 | | 4/2001 | Gooderum et al. |
| 6,226,719 B1 | | 5/2001 | Minow |
| 6,470,397 B1 | | 10/2002 | Shah et al. |
| 6,480,711 B1 | | 11/2002 | Guedalia |
| 6,600,726 B1 | | 7/2003 | Nevo et al. |
| 6,603,744 B2 | | 8/2003 | Mizutani et al. |
| 6,614,768 B1 | | 9/2003 | Mahany et al. |
| 6,633,929 B1 | | 10/2003 | Hyder et al. |
| 6,658,018 B1 | * | 12/2003 | Tran et al. .................. 370/465 |
| 6,704,293 B1 | * | 3/2004 | Larsson et al. ............. 370/255 |
| 6,728,270 B1 | * | 4/2004 | Meggers et al. ............ 370/514 |
| 6,792,286 B1 | * | 9/2004 | Bharath et al. .......... 455/554.2 |
| 7,000,015 B2 | * | 2/2006 | Moore et al. ................ 709/224 |
| 2002/0012329 A1 | | 1/2002 | Atkinson et al. |

FOREIGN PATENT DOCUMENTS

| | | |
|---|---|---|
| EP | 0 848 560 A2 | 6/1998 |
| WO | WO 99/21313 A2 | 4/1999 |
| WO | WO 99/33301 A1 | 7/1999 |
| WO | WO 99/39480 A2 | 8/1999 |
| WO | WO 99/50999 A1 | 10/1999 |
| WO | WO 00/10357 A1 | 2/2000 |

OTHER PUBLICATIONS

Anonymous, "Interoperability Requirements for Bluetooth as a WAP Bearer", *Bluetooth Specification Version 1.0B*, Part F:4, pp. 496-515 (Nov. 1999).

Anonymous, "Core", *Specification of the Bluetooth System Version 1.0B*, vol. 1, pp. 1-1082 (Dec. 1999).

Anonymous, "Profiles", *Specification of the Bluetooth System Version 1.0B*, vol. 2, pp. 1-440 (Dec. 1999).

Bhagwat, Pravin, "Networking Over Bluetooth: Overview and Issues", IAB Wireless Workshop, pp. 1-48 (Mar. 2000).

Broch, et al., "Supporting Hierarchy and Heterogeneous Interfaces in Multi-Hop Wireless Ad Hoc Networks," *Proceedings of the Workshop on Mobile Computing, I-SPAN*, pp. 1-6 (Jun. 1999).

Cant, Chris, "Windows Driver Model (WDM) Device Drivers," PHD Computer Consultants Ltd., pp. 1-13 printed at http://www.phdcc.com/WDMarticle.html on Mar. 20, 2003 (1999).

Fleming et al., "Architectural Overview of Intel's Bluetooth Software Stack," *Intel Technology Journal*, Q2, pp. 1-10 (2000).

Foley, Dr. Michael W., "Bluetooth User Experience in Windows," Microsoft Corporation.

Gholmieh, Ralph A., "Overview of Current Research Issues and Developments in Wireless LANS and Wireless ATM", University of San Diego, pp. 1-25 printed at http://cwc.ucsd.edu/~rgholmie/WirelessPaper/WirelessPaper.html on May 11, 2004 (Oct. 1998).

Haartsen, J.C. and S. Mattisson, "Bluetooth—A New Low-Power Radio Interface Providing Short-Range Connectivity," *Proceedings of the IEEE*, vol. 88, No. 10, pp. 1651-1661 (Oct. 2000).

Hall et al., "Programming with Sockets," *Windows Sockets: An Open Interface for Network Programming under Microsoft Windows Version 1.1*, pp. 4-11 printed at http://burks.brighton.ac.uk/burks/pcinfo/progdocs/winsock/winsock.htm on Jun. 15, 2004 (Jan. 1993).

Kardach, James, "Bluetooth Architecture Overview," Intel Corporation.

Mettala, Riku, "Bluetooth Protocol Architecture," Bluetooth Special Interest Group, Nokia Mobile Phones, pp. 1-20 (Sep. 1999).

Microsoft Corporation, "Plug and Play for Windows NT 5.0," *Windows NT Server*, pp. 1-23 (1997).

Microsoft Corporation, "Remote NDIS Specification", Rev. 0.80, pp. 1-50 (Oct. 1999).

Microsoft Corporation, "Windows Whistler IRPs for Bluetooth," *Bluetooth Design Review*, Draft Version 0.7, pp. 1-23 (Jun. 2000).

Miller, Brent, "Mapping Salutation Architecture APIs to Bluetooth Service Discovery Layer," Version 1.0, Bluetooth Special Interest Group, IBM Corp., pp. 1-26 (Jul. 1999).

Moore, Tim, "Windows Wireless Architecture," Microsoft Corporation.

Rajagopal, Sridhar, "RFCOMM Protocol Basics," Intel Corporation, pp. 1-42 (Dec. 1999).

Ray, Ken and Stan Adermann, "Bluetooth Stack in Windows," Microsoft Corporation.

Richard III, Golden G., "Service Advertisement and Discovery: Enabling Universal Device Cooperation," *IEEE Internet Computing*, pp. 18-26 (Sep. 2000).

Sobrinho, João L. and A.S. Krishnakumar, "Quality-of-Service in Ad Hoc Carrier Sense Multiple Access Wireless Networks," *IEEE Journal on Selected Areas in Communications*, vol. 17, No. 8, pp. 1353-1368 (Aug. 1999).

Sörensen, Johan, "RFCOMM in depth," pp. 1-42 (Dec. 1999).

Tomlinson, Paula, "Plug and Play," *Windows Developer's Journal*, pp. 1-6 (Dec. 1995).

Udell, Jon, "Windows NT Up Close" An In-depth Look at Microsoft's Next-Generation Operating System, *Byte*, vol. 17, No. 10, pp. 167-182 (Oct. 1992).

UPnP Forum, "UPnP Device Architecture," pp. 1-52 printed at http://www.upnp.org/download/UPnPDA10_20000613.htm on Jun. 15, 2004 (Jun. 2000).

Weinmiller et al., "Analyzing and Improving the IEEE 802.11-MAC Protocol for Wireless LANs," *Proceedings of Mascots '96*, pp. 200-206 (1996).

Anonymous, "ETSI Digital Cellular Telecommunications System (Phase 2+): Terminal Equipment to Mobile Station (TE-MS) Multiplexer Protocol", *Global System for Mobile Communications*, vol. 101, No. 369, pp. 2-54 (1998).

Anonymous, "IEEE 802-11 Security White Paper," *Windows NT Networking*, Sep. 26, 2000 printed at:<\\networking\pm\WhistlerSpecs\Core> Networking\IEEE 802.11 Security White Paper.

Ayyagari, et al., "IEEE 802.11 Quality of Service," *White Paper*, printed at http://grouper.ieee.org/groups/802/11Documents/DT1-50.html pp. 2-9 (Feb. 15, 2000).

Bahl, Paramvir, "Enhancing the Windows Network Device Interface Specification for Wireless Networking," Submitted to the *IEEE OpenArch 2001*, Fairbanks, Alaska, (2000).

Bahl, Victor and Holland, Gavin, "Enhancing the Windows Network Device Interface Specification for Wireless Networking," *Microsoft Research Technical Report*, MSR-TR-2000-84, (Aug. 2000).

Bahl, et al., "The Choice Network -Broadband Wireless Internet Access In Public Places," *Microsoft Research Technical Report*, MSR-TR-2000-21, (Feb. 2000).

Gholmieh, Ralph A., "IEEE 802.11," printed at http://cwc.ucsd.edu/~rgholmie/WirelessPaper/node4.html#SECTION00031000000000000000 (Oct. 5, 1998).

Haartsen, J.C. and S. Mattisson, "Bluetooth-A New Radio Interface providing Ubiquitous Connectivity," *Proceedings of the IEEE*, pp. 107-111 (Oct. 2000).

IEEE Standard 802.11.1999, *IEEE Standard for Wireless LAN Medium Access Control (MAC) and Physical Layer (PHY) Specification*, IEEE (1999).

Megowan et al., "IrDA Object Exchange Protocol," *Counterpoint Systems Foundry*, pp. 2-85 (Mar. 18, 1999).

Miu, Allen and Victor Bahl, "The Choice Network -Dynamic Host Configuration for Managing Mobility Between Public and Private Networks," *Microsoft Research Technical Report*, MSR-TR-2000-85, pp. 1-14 (Aug. 2000).

O'Hara, Bob and Petrick, Al, *The IEEE 802.11 Handbook A Designer's Companion*, Standards Information Network IEEE Press, pp. 2-174 (1999).

\* cited by examiner

SYSTEM AND METHOD FOR CONCURRENT OPERATION OF A WIRELESS DEVICE IN TWO DISJOINT WIRELESS NETWORKS

CROSS-REFERENCE TO RELATED PATENT APPLICATIONS

This patent application is a continuation of copending U.S. patent application Ser. No. 09/954,087, filed Sep. 17, 2001, entitled "SYSTEM AND METHOD FOR CONCURRENT OPERATION OF A WIRELESS DEVICE IN TWO DISJOINT WIRELESS NETWORKS."

TECHNICAL FIELD

This invention relates generally to wireless network communications. In particular, the invention relates to the operation of a wireless node functioning at the same time as a member of two disjoint wireless networks, such as an infrastructure network and an ad-hoc network.

BACKGROUND OF THE INVENTION

Devices conducting network communications over wireless links are becoming increasing popular. Wireless links typically transmit data over radio frequency channels but may operate over other carrier frequency ranges, such as infrared. Most radio frequency ("RF") based wireless networks are designed to operate in two basic modes: the infrastructure mode and the peer-to-peer or ad hoc mode.

In the infrastructure ("IS") mode, which is also sometimes referred to as the managed network mode, each wireless network node communicates with the other nodes in the network through an access point ("AP") node of the IS network. The packets directed by an IS node to another IS node carry the AP's Media Access Control ("MAC") address in the link layer header. The access point functions as a bridge, repeater, gateway, and firewall between wireless nodes and wired nodes of the network. The access point also apportions bandwidth of the communication channel to the wireless IS nodes to ensure the quality of the communications.

In the ad hoc ("AH") mode, a wireless node communicates directly, i.e., in a peer-to-peer fashion, with other nodes within its RF range without going through an intermediate node such as the access point of the IS network. Ad hoc wireless network connections are useful when close-by users want to communicate with each other in places where no IS network exists, or when they fail to be authorized by the access point of an existing IS network.

Conventionally, there is no interaction between nodes in an infrastructure network and nodes in an ad hoc network even if they have overlapping transmission ranges. There are, however, many situations where the ability for a wireless device to operate in both the ad-hoc and infrastructure networks may be desirable. For instance, in one scenario, employees from company A conduct a business meeting at company B with an employee of company B. Company B has an internal corporate network that supports an infrastructure wireless network. The visitors need to share electronic information such as documents, presentations, and data with their host. This can be done if the visitors can use their laptop computers to communicate wirelessly with the laptop computer of company B. For security concerns, the visitors are not allowed access to company B's internal network. Thus, the laptop computers of the visitors cannot operate as nodes of company B's infrastructure network.

One solution is that the visitors' computers can form an ad hoc wireless network with the host's computer. This solution requires the host's computer to operate as an ad hoc node. This, however, can pose a problem to the computer of the host, i.e., company B's employee, if he intends to have his computer connected wirelessly to the internal network of company B so that he can retrieve data for sharing with the visitors. Traditionally, nodes operating in the IS mode cannot talk to any node operating in the AH mode, and vice versa. This is because the IS nodes talk through the AP while AH nodes talk directly among themselves, and the AP does not know about AH nodes. To function as a node of the ad hoc network, the host's computer has to disconnect and log off from the infrastructure network. This is done by an administrative program that manages the wireless configuration of the card on the computer by telling the wireless driver to disassociate from the AP and enter the ad hoc mode. When operating in the ad hoc mode, the host's computer will not be able to access the IS network. When it later wants to function as a node of the infrastructure network, it then has to exit the ad hoc network and reconnect to the infrastructure network.

SUMMARY OF THE INVENTION

In view of the foregoing, the invention provides a system and method for a wireless device to operate concurrently as a member of first and second wireless networks, such as an infrastructure ("IS") network and an ad hoc ("AH") network, that are separate and disjoint. In other words, the wireless device functions as a "dual-mode" node in the two wireless networks. The dual-mode node has a wireless controller driver inserted in its networking stack (e.g., the stack comprising the network and NDIS drivers) that exposes two virtual wireless network adapters, one for the first wireless network and one for the second wireless network. Each virtual wireless network adapter has an associated queue for queuing packets in the flow for the corresponding wireless network mode. The wireless controller driver controls the switching of the network mode, which may be triggered by signals transmitted by the first network, such as poll signals sent by an access point of an IS network. When the mode is switched from operating in the first network to operating in the second network, the first virtual network adapter is disabled and the second virtual network adapter is enabled, and the queued packets in the queue for the second virtual network adapter are transmitted over the second wireless network.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
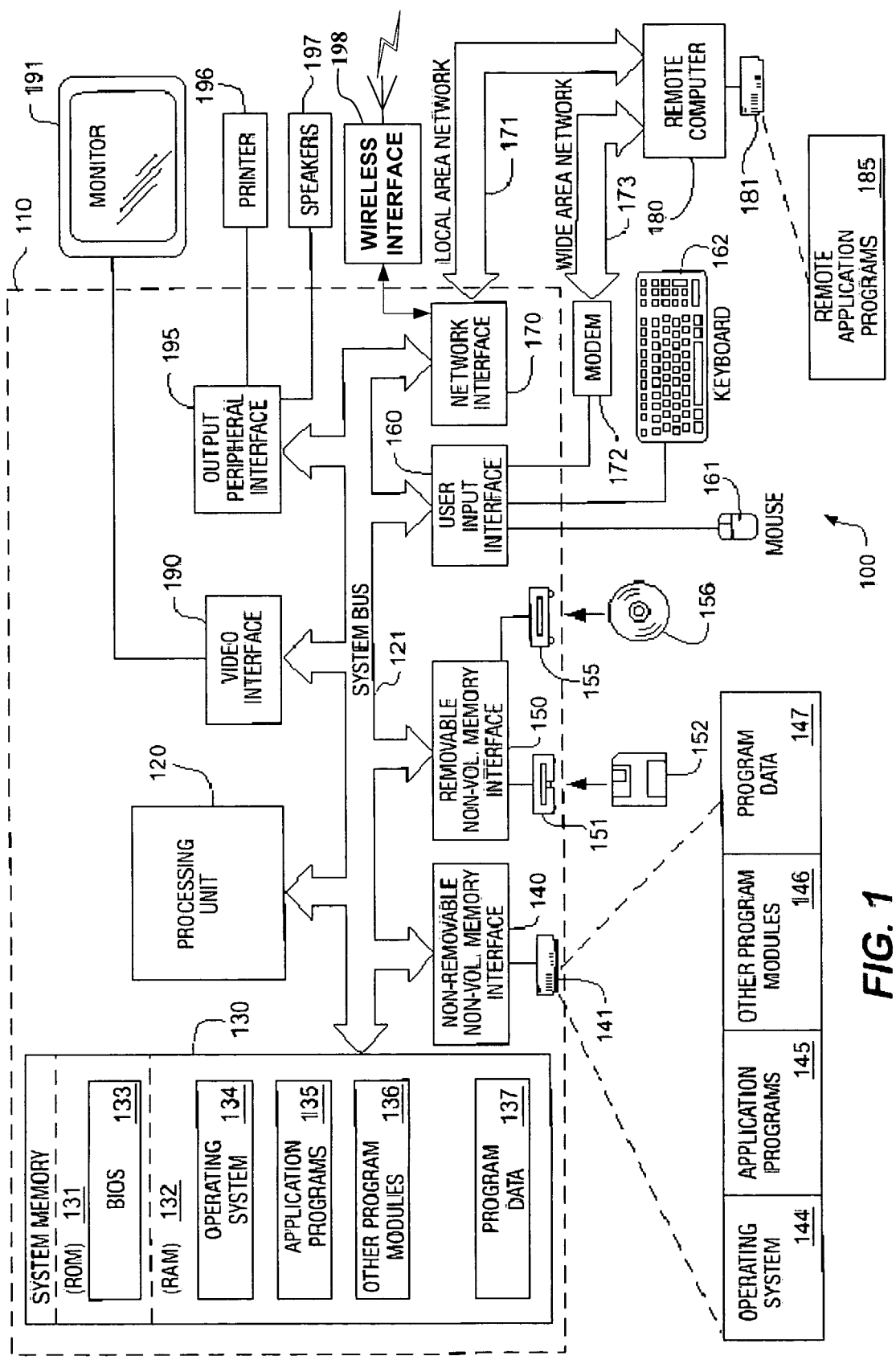
FIG. 1 is a block diagram generally illustrating an exemplary computer system on which the present invention may be implemented.

Turning to the drawings, FIG. 1 illustrates an example of a suitable computing system environment 100 on which the invention may be implemented. The detailed description of the invention is provided in connection with FIG. 2 and the remaining drawings. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100. The invention is operational with numerous other general-purpose or special-purpose computing system environments or configurations. Examples of well-known computing systems, environments, and configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computer 110 typically includes a variety of computer-readable media. Computer-readable media can be any available media that can be accessed by the computer 110 and include both volatile and nonvolatile media, removable and non-removable media. By way of example, and not limitation, computer-readable media may include computer storage media and communications media. Computer storage media includes volatile and nonvolatile, removable and non-removable media implemented in any method or technology for storage of information such as computer-readable instructions, data structures, program modules, or other data. Computer storage media include, but are not limited to, random-access memory (RAM), read-only memory (ROM), EEPROM, flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can accessed by the computer 110. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media such as a wired network and a direct-wired connection and wireless media such as acoustic, RF, optical, and infrared media. Combinations of the any of the above should also be included within the scope of computer-readable media.

The system memory 130 includes computer storage media in the form of volatile and nonvolatile memory such as ROM 131 and RAM 132. A basic input/output system (BIOS) 133, containing the basic routines that help to transfer information between elements within the computer 110, such as during start-up, is typically stored in ROM 131. RAM 132 typically contains data and program modules that are immediately accessible to or presently being operated on by processing unit 120. By way of example, and not limitation, FIG. 1 illustrates an OS 134, application programs 135, other program modules 136, and program data 137. Often, the OS 134 offers services to applications programs 135 by way of one or more application programming interfaces (APIs) (not shown). Because the OS 134 incorporates these services, developers of applications programs 135 need not redevelop code to use the services. Examples of APIs provided by operating systems such as Microsoft's "WINDOWS" are well known in the art.

The computer 110 may also include other removable/non-removable, volatile/nonvolatile computer storage media. By way of example only, FIG. 1 illustrates a hard disk interface 140 that reads from and writes to non-removable, nonvolatile magnetic media, a magnetic disk drive 151, which may be internal or external, that reads from and writes to a removable, nonvolatile magnetic disk 152, and an optical disk drive 155 that reads from and writes to a removable, nonvolatile optical disk 156 such as a CD ROM. Other removable/non-removable, volatile/nonvolatile computer storage media that can be used in the exemplary operating environment include, but are not limited to, magnetic tape cassettes, flash memory cards, DVDs, digital video tape, solid state RAM, and solid state ROM. The hard disk drive 141, which may be internal or external, is typically connected to the system bus 121 through a non-removable memory interface such as interface 140, and magnetic disk drive 151 and optical disk drive 155 are typically connected to the system bus 121 by a removable memory interface, such as interface 150.

The disk drives and their associated computer storage media discussed above and illustrated in FIG. 1 provide storage of computer-readable instructions, data structures, program modules, and other data for the computer 110. In FIG. 1, for example, hard disk drive 141 is illustrated as storing an OS 144, application programs 145, other program modules 146, and program data 147. Note that these components can either be the same as or different from the OS 134, application programs 135, other program modules 136, and program data 137. The OS 144, application programs 145, other program modules 146, and program data 147 are given different numbers here to illustrate that they may be different copies. A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, and scanner. These and other input devices are often connected to the processing unit 120 through a user interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171, personal area network (PAN) and a wide area network (WAN) 173, and at least one wireless link, for instance via wireless interface 198 complete with an antenna, but may also include other networks. Such networking environments are commonplace in offices, enterprise-wide computer networks, intranets, and the Internet or are expected to be introduced in the near future.

When used in a LAN networking environment, the computer 110 is connected to the LAN 171 through a network interface or adapter 170 or a wireless transmitter. When used in a WAN networking environment, the computer 110 typically includes a modem 172, wireless antenna or other means for establishing communications over the WAN 173, such as the Internet. The familiar modem 172, which may be internal or external, may be connected to the system bus 121 via the user-input interface 160, or via another appropriate mechanism. With the advent of 2.5G and 3G Wireless Wide Area Network ("WWAN"), the interface could also be a WWAN packet based network interface card. In a networked environment, program modules depicted relative to the computer 110, or portions thereof, may be stored in a remote memory storage device. By way of example, and not limitation, FIG. 1 illustrates remote application programs 185 as residing on memory device 181, which may be internal or external to the remote computer 180. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that several of the acts and operations described hereinafter may also be implemented in hardware.

The present invention is directed to a way to enable a wireless device to operate concurrently as a node in two disjoint wireless networks, such as an infrastructure network and an ad hoc network, and to enable the wireless nodes to go back and forth easily between communicating over the two disjoint wireless networks. In other words, the present invention provides a way to set up a "dual-mode" wireless node that can communicate in both of the disjoint wireless networks. The dual-mode node can function as a liaison between the two disjoint networks, while maintaining the independence and security of each network.

Figure 2:
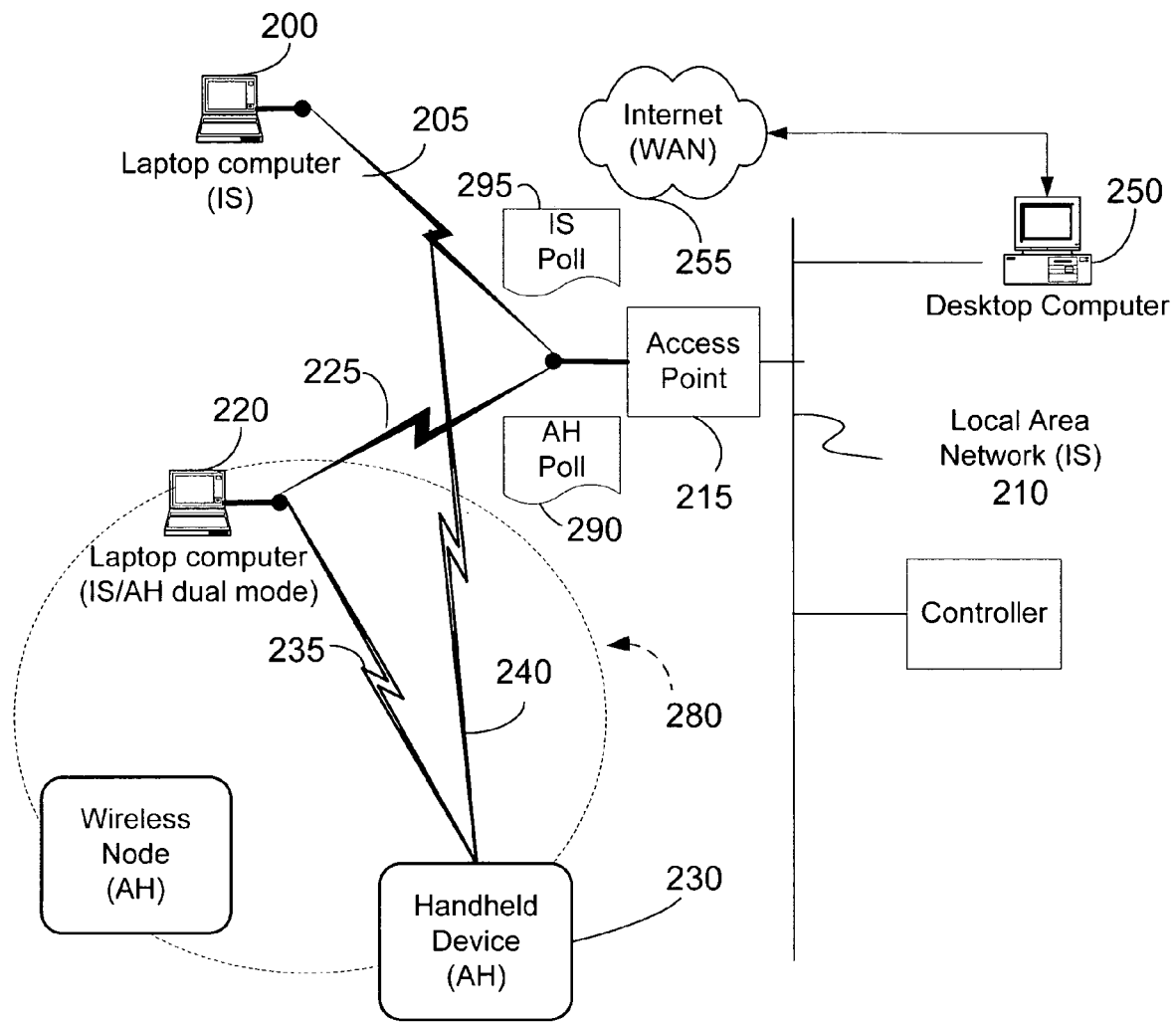
FIG. 2 is schematic diagram showing a dual-mode wireless device that participates concurrently in an infrastructure network and an ad hoc network.

For example, FIG. 2 illustrates a computing environment in which such a dual-mode wireless device may be used. In this environment, an infrastructure ("IS") network 210 co-exists with an ad hoc ("AH") network 280 such that their transmission ranges overlap. Moreover, the two wireless networks use the same frequency channel for wireless transmissions. In the particular example illustrated in FIG. 2, the IS network is a local area network ("LAN") that has an access point node 215 for communicating with wireless devices in the IS network. The access point 215 servers as an interface between the wireless nodes and the wired portion of the IS network. Through the access point, the wireless nodes can access the wired portion of the IS network and beyond to other connected networks such as the Internet 255.

In the IS network 210 illustrated in FIG. 2, a laptop computer 200 forms a radio frequency link 205 with the access point 215. As part of the IS communication scheme, the IS network 210 assigns the laptop computer 200 with a routable network IP address, the prefix of which is the same as that for other nodes within the network 210. Another laptop computer 220 in the IS network communicates with the access point 210 via a radio frequency link 225. The access point 215 controls wireless communication traffic to and from each of the laptop computers 200 and 220. This control is exerted for providing quality of service assurances to tasks or applications executing on the IS nodes. The access point 215 manages the communications of the IS wireless nodes by transmitting poll signals (termed "infrastructure poll signals") to direct an IS wireless node, such as the laptop computer 200, to transmit its packets in a specified time period.

In the example illustrated in FIG. 2, the laptop computer 220 is a dual-mode device. It is part of the IS network 210 when it operates in the IS mode and part of the AH network 280 when it operates in the AH mode. The AH network 280 illustrated in FIG. 2 also includes a handheld device 230 that communicates with the laptop computer 220 over a radio frequency link 235. It will be appreciated that other types of wireless devices, such as cellular phones that talk over the 802.11b wireless LAN protocol, may be included in the AH network. While communicating with the handheld device 230, the laptop computer 220 is in the AH mode and is responsive to an IP address in the autonet ad-hoc address range. In other words, laptop computer 220 responds to two different IP addresses—the infrastructure address and the ad-hoc address. Ad_hoc addresses are non-routable and are in a specified range of autonet addresses. This range is reserved for AH communications.

The existence of the dual-mode node provides an effective solution to the problem that conventional IS and AH networks cannot communicate with each other. The dual-mode node is able to talk with ad hoc nodes to share data that it wants to share while also being on the IS network. It shares data with ad hoc nodes without allowing the ad hoc nodes to access privileged information belonging to the IS network. To communicate with the wireless nodes in the AH network, the dual-mode node switches over to the AH mode. When communicating with another IS wireless node or the wired portion of the IS network, the dual-mode node switches back to the IS mode.

An important aspect of the invention is the ability of the dual-mode wireless device to switch easily between the two network communication modes corresponding to the two disjoint wireless networks. By switching back and forth between the two modes, the dual-mode device can participate in both wireless networks without having to be disconnected from one network in order to communicate over the other network. The switching between the two communication modes is transparent to the applications on the dual-mode device that are communicating in either of the two modes with applications on other computers, as well as to various components of the operating system (e.g., services, transport, and network drivers).

Figure 3:
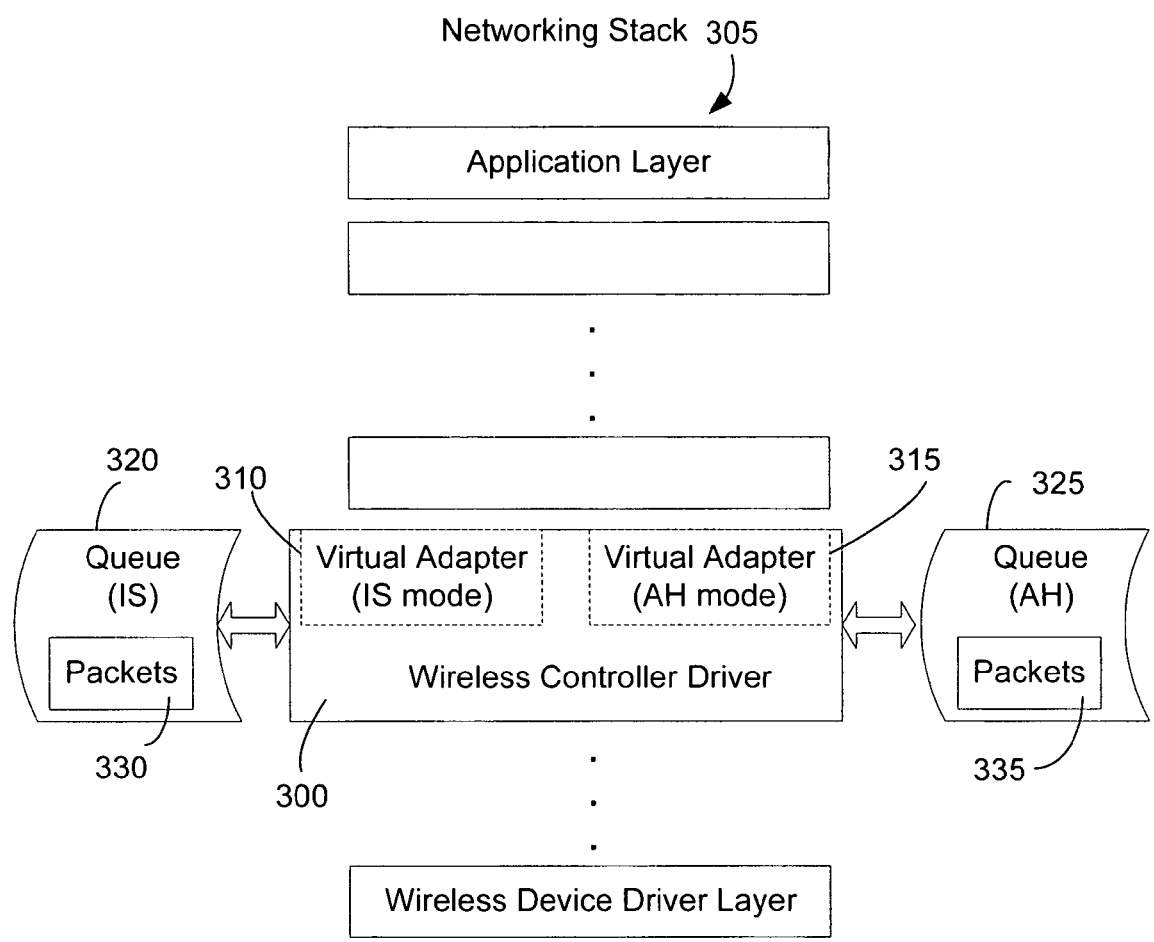
FIG. 3 is a schematic diagram showing a wireless controller driver in a networking stack for enabling a dual-mode wireless device to switch its operation mode.

Referring now to FIG. 3, in accordance with an aspect of the invention, to facilitate the switching between the two network modes, a wireless controller driver (WCD) 300 is provided as an inserted module (typically called a "shim") in the networking stack 305 (e.g., the IP stack) above the actual wireless device drivers. The wireless controller driver 300 is responsible for enabling and disabling alternatingly the two wireless network modes. To that end, it exposes two "virtual network adapters" to a higher layer in the network protocol stack. The term "adapter" is typically used in the context of operating system architecture to represent a network interface card (also called a network adaptor). It is a handle that, when passed in a function, relates the request made to a particular physical network interface card. In this case, the wireless controller driver will associate the request, i.e. the packet sent with the request, with a particular mode of operation of a "single" wireless network card. Since each of the two adapters exposed are for the same physical wireless adapter but imply different modes of operation, they are referred to herein as "virtual adapters."

Each of the two virtual network adapters 310 and 315 corresponds to one of the two wireless communication modes and has an associated queue 320 or 325 for storing communication packets sent by the networking stack over the virtual device adapter for transmission over the corresponding wireless network. The wireless mode controller 300 transmits the queued packets 330 or 335 for the virtual adapter that has become active when the dual-mode device is switched into the corresponding wireless network mode.

In a preferred embodiment described below, the wireless mode controller is implemented in the architecture of the Windows operating system of Microsoft Corporation. It will be appreciated, however, that the network mode switching in accordance with the invention for enabling a wireless node to participate in two disjoint wireless networks can be implemented in computer platforms based on other operating systems.

Figure 4:
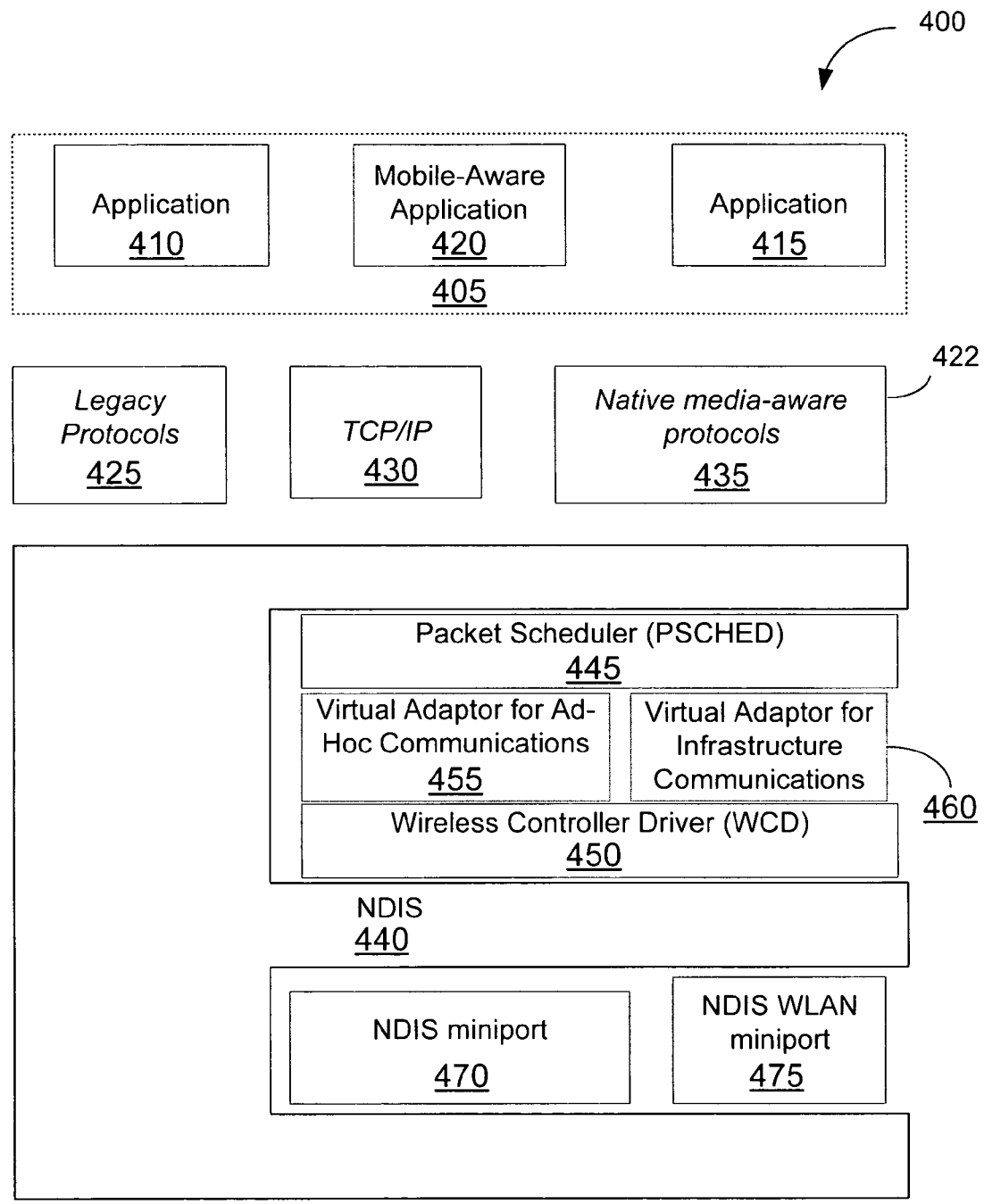
FIG. 4 is a schematic diagram showing an implementation of the wireless controller driver.
Figure 5:
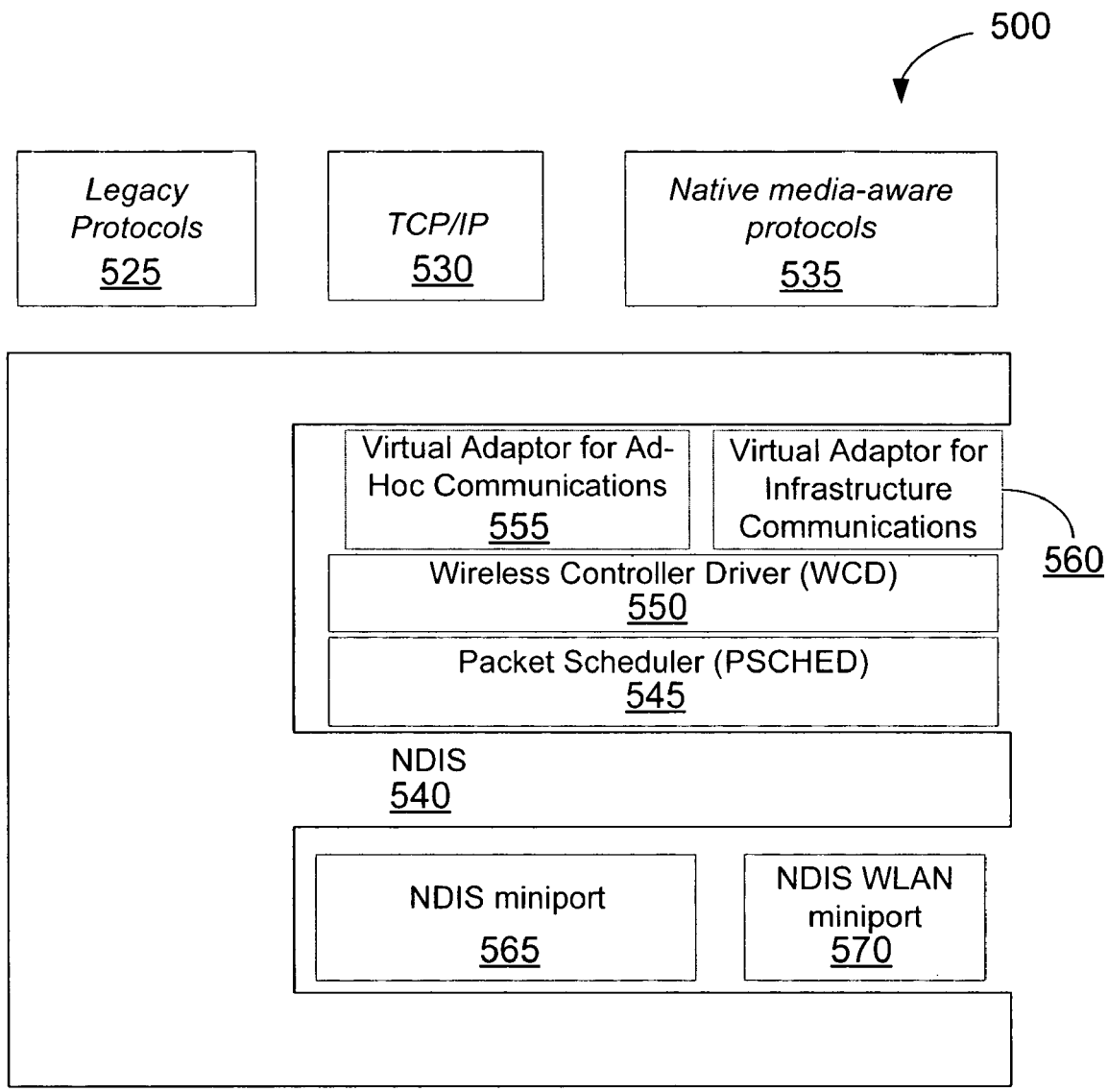
FIG. 5 is a schematic diagram showing an alternative implementation of the wireless controller driver.

Two implementations of the wireless mode controller based on the Windows NT operating system are shown in FIGS. 4 and 5, respectively. Turning first to FIG. 4, in this implementation, the wireless controller driver is implemented as a "shim" in the Network Driver Interface Specification ("NDIS") driver layer 440 in the networking stack 400, which is shown in a representation generally similar to the Open Systems Interface ("OSI") networking model. In the OSI model, a networking stack is represented as a set of layers, usually seven layers, such that each layer processes packets without regard to the subsequent processing by other layers. As illustrated in FIG. 4, at the top of the networking stack is the application layer 405, which includes application programs such as applications 410 and 415, and a mobile-aware application 420. A mobile aware application is one that is informed of and adapts to mobility-initiated changes in the environment (address and configuration changes due to the node getting connected to a different network, the changes in the speed, latency, congestion, loss, throughput between networks, the location of the host, etc). It uses functions provided by the operating system for this purpose.

The application layer 405 sends and receives packets (via intermediate layers not shown in FIG. 4) to the transport protocol layer 422, which is illustrated to have legacy protocols 425, the TCP/IP 430, and native media aware protocols 435. As shown in FIG. 4, the wireless controller driver is placed between a packet scheduler driver ("PSCHED") 445 and the WLAN miniport driver 475. The protocols in the transport protocol layer 422 communicate with the NDIS-compliant driver layer 440. The NDIS driver layer 440 is a framework for supporting the packet scheduler 445 and other NDIS drivers. The packet scheduler 445 services packet flows in order of priority or weight or other criteria as dictated by policy. The packet scheduler 445 sends packets down the network protocol stack in accordance with their respective quality of service ("QoS") levels.

As shown in FIG. 4, in this implementation, the wireless controller driver (WCD) 450 is inserted between the packet scheduler 445 and the wireless LAN miniport 475 in the stack. At its upper edge, the wireless controller driver 450 exposes two wireless LAN adapters, namely the AH wireless adapter 455 and the IS wireless adapter 460. The wireless controller driver also creates for each mode of operation a queue for storing packets in the data flow for that mode. The queue holds packets for that mode transmitted by the protocols in the higher layer, such as the TCP/IP, until that mode becomes active. When the corresponding mode becomes active, the packets in the queue are passed down to the miniport wireless device driver 475 for transmission over the associated wireless network.

The packet scheduler 445, being above the wireless controller driver in the stack, is utilized for handling flows for the two virtual adapters 455 and 460. To the packet scheduler, the two virtual adaptors exposed by the wireless controller driver 450 would look like real physical adapter, and it would bind to these two adapters and expose two corresponding adapter at its own upper edge. The wireless controller driver 450 is able to set the type of the flows in the packet scheduler for the two virtual adapters.

If the TCP/IP layer or an application or the WCD does not set the flows, the packet scheduler 445 would use the "best effort" policy as the default scheme of flow control. The wireless controller driver 450 would indicate to the packet scheduler 445 the online/offline status of the adapters as they come on/off because of the switching of the modes. It should be noted that the online/offline status is a different kind of indication than the media connect/disconnect indication. Specifically, media connect/disconnect indication is typically used for indicating handoff between access points and is propagated up the stack to the protocol drivers. The on/off status indication, on the other hand, is meant primarily for triggering transmissions from the queues maintained by the packet scheduler. The WCD 450 will trigger an on/off status triggering the Packet Scheduler (PS) 445 to send packets down. In this case, there is no need for any queue in the WCD.

In an alternative implementation, no on/off status is given to the PS. The PS will send packets down based on the transmission rate and type of flow set for the flows that have been established for each adapter. In this case, WCD will have to maintain queues in order to buffer packets when the mode corresponding to the adapter is off.

As will be described in greater detail below, in a preferred embodiment, the switching of the wireless network mode is triggered by poll signals broadcast by an access point of the IS network. In response to the poll signals, the wireless network driver will disable one of the virtual IS and AH modes of operation and enable the other.

For purposes of adapter configuration, the IS wireless adapter, like a wire-line adapter, is preferably exposed to the user through the graphic user interface ("GUI") of the operating system. The user will be able to specify a static network configuration or enable the adapter for configuration under the Dynamic Host Configuration Protocol ("DHCP"). If enabled for DHCP, the wireless device will get the card's configuration as well as some global configuration from a DHCP server.

For the AH mode, the wireless device may take an address from a reserved range. This range may, for instance, be a sub-range within the auto net range specified by IANA for operations on a non-routed single LAN network. As an example, it could be the range of address between 169.254.254.0 and 169.254.254.255. Before taking an address in the reserved range, the client checks for conflicts through gratuitous Address Resolution Protocol ("ARP") query packets according to the standard TCP/IP semantics.

The virtual infrastructure wireless adapter 460 is preferably assigned with a higher priority than the virtual ad-hoc wireless adaptor 455. In other words, when a TCP/IP client (which may be an application or a kernel mode client) queries the addresses of the wireless device, the auto net address should be the last address in the list or not returned in the list. This rule prevents a TCP/IP client from binding to the auto net address since typically clients that call a function to get the addresses of the machine bind to the first one in the list. In general it is not desirable to allow TCP/IP client to bind to an auto-net address because it is not routable. However, in another embodiment, it is possible to expose the autonet address to be returned in the list for the benefit of newer mobile aware applications that may choose to bind to the autonet address when communicating with devices having autonet addresses. This has advantages in that applications that bind to the autonet address continue to send and receive packets to/from other AH or dual mode nodes over the AH network even when the DHCP assigned routable address expires The ad-hoc interface's IP address is used as the address of the default gateway for packets on the ad-hoc network. This results in the stack initiating an ARP query when communicating with any address over the ad-hoc interface. Moreover, the default gateway over the IS interface is preferably treated as a higher metric than the one over the ad-hoc interface. Also, the DNS (domain name service) resolver on a wireless node preferably performs a multicast DNS on all adapters after querying the DNS servers on the IS network (as set statically or through DHCP) to find nodes on the ad-hoc network.

With respect to name resolution, a dual-mode device resolves WINS and DNS names by querying the WINS and DNS servers specified when communicating on the IS network or by broadcast/multicast DNS queries when communicating on the AH network. In other words, the manner in which name resolution is done depends on the adapter (IS or AH) a client application wants to communicate over. For instance, the TCP/IP stack would use the virtual adapter corresponding to the IP address the client application is bound to. If the client application is not bound to either the AH or IS virtual adapter (e.g., it is bound to the free floating INADDR_ANY address), then both unicast and broadcast/multicast name queries will be used to resolve the name, the former over the IS adapter and the latter over the AH adapter. In other words, the queries will be sent to the IS configured WINS and DNS servers as well as broadcast/multicast on the AH network. If the AH adapter is statistically configured with addresses of DNS/WINS, the name servers of the AH adapter will be queried instead of a broadcast/multicast.

Exposing two virtual adapters to the TCP/IP results in the TCP/IP creating separate routing table entries for each. This helps in the TCP/IP directing packets over the right adapter based on the destination address. For example, packets to be sent to autonet addresses are rightly directed over the AH adapter while packets to be sent to routable addresses are directed over the IS adapter. In other words, using non-overlapped IP subnets for AH and IS adapters results in packets getting transmitted over the right adapter and therefore in the right mode because of the routing table entries created by the TCP/IP to map the AH and IS subnets to the AH and IS adapters respectively.

FIG. 5 illustrates and alternative implementation of the wireless controller driver. In this implementation, the wireless controller driver 550 is placed between the TCP/IP 530 in the protocol layer and the packet scheduler 545, rather than under the packet scheduler as in the implementation shown in FIG. 4. Like the arrangement in FIG. 4, the wireless controller driver 550 exposes a virtual ad-hoc wireless adapter 555 and a virtual infrastructure wireless adapter 560. The wireless controller driver 550 also sets the flows for each mode in the packet scheduler 545 and triggers the packet scheduler 545 into sending packets from one queue or the other when the mode is switched.

The difference between this implementation from the one described in FIG. 4 is in the manner in which the mode-switch trigger is given, since in this scheme the packet scheduler 545 is not aware of the virtual wireless adapters 555 and 560 corresponding to the flows. In the FIG. 4 scheme where the wireless controller driver (WCD) is below the PS, the trigger identifies the adapter (with one or more flows as set by an application) whose packets can be sent down. In the FIG. 5 scheme where WCD is above the PS, the trigger identifies the flow whose packets can be sent down. In the latter case, the flow corresponding to the AH or IS mode is triggered. The flows queued by the PS are all for the one adapter exposed by the WLAN driver to PS, which is unaware that this adapter is being exposed as two virtual adapters because WCD is above it.

Returning now to FIG. 2, in accordance with a feature of a preferred embodiment, communications over the two disjoint wireless networks, namely the IS network and the AH network, on a common frequency channel are coordinated by the access point of the IS network. Conventionally, the AH nodes communicate whenever they detect the medium is unoccupied. When the wireless AH network uses the same frequency channel used by the wireless IS network, the wireless transmissions 240 from the ad-hoc devices may collide with transmissions by IS devices. For instance, as depicted in FIG. 2, radio transmissions by the laptop computer 200 to communicate with the access point 215 over wireless link 205 may collide with radio transmissions by the AH nodes. A consequence of such a collision is that both of the transmitting wireless devices enter a back-off period before trying again to transmit their packets. As a result of the collision, the presence of AH network nodes within the range of the IS network can interfere with the wireless communications in the IS network, thereby disrupting the quality of service assurances offered by the IS network to the wireless IS nodes.

In accordance with the feature of the embodiment, such collisions are avoided by requiring the wireless nodes in both wireless networks to listen to the access point to tell them when they can talk over the frequency channel. To that end, the AH nodes (including AH-only and dual-mode devices) within the range of the access point register with the access point as ad hoc devices. The access point uses this count and the count of the IS nodes (including IS-only and dual-mode devices) to determine the bandwidth to be apportioned for AH mode operation. For instance, the access point may reserve a certain percentage, such as 20%, of the wireless bandwidth for the AH operations while reserving the rest for IS operations.

The access points controls the bandwidth usage by sending two types of poll signals. The first type, called the "AH poll signals," are broadcast to the AH nodes as a group. Each AH poll signal specifies a time slot during which the AH nodes may transmit in the frequency channel, and the AH nodes will coordinate among themselves as to who will get the bandwidth. The second type of poll signals are called the "IS poll signals." Each IS poll signal is unicast to a particular IS node and specifies a time slot for that IS node to use the bandwidth.

In this embodiment, the poll signals also cause the dual-mode device 220 to switch its wireless network mode. When the dual-mode device 220 receives an AH poll signal 290 from the access point 215, it switches to the AH mode by disabling the virtual wireless adapter for the IS mode and enabling the virtual wireless adapter for the AH mode. When the bandwidth is available to the dual-model device, the queued packets in the queue for the AH virtual adapter are transmitted over the frequency channel to the other AH nodes. Later, when the dual-mode device receives an IS poll signal 295, it switches the wireless mode to the IS mode by disabling the virtual wireless adapter for the AH mode and enabling the virtual wireless adapter for the IS mode. If the IS poll signal is directed to the dual-mode device operating as an IS node, the queued packets in the queue for the IS virtual adapter are transmitted over the frequency channel to the access point, which then forwards the packets to their intended recipients.

In the embodiment of FIGS. 4 and 5, the switching between the two modes is done by the wireless controller driver (WCD) by plumbing an I/O control (IOCTL) into the WLAN network interface card (NIC) driver instructing it to enable the AH or IS mode of operation. When instructed to switch from IS to AH mode, the WLAN NIC driver does not disassociate from the AP, i.e., it does not log off from the IS network to which it is associated. Correspondingly when instructed to switch back to IS (from AH), the WLAN NIC driver does not re-associate with the AP, i.e., it does not log back on to the IS network since it never disassociated with it earlier. The enabling and disabling of the virtual adapters as described above involves the enabling/disabling of a particular mode of operation as controlled by the WCD, with all relevant state transitions being internal to WCD. The enabling/disabling is not exposed to the drivers layered on top of the WCD. They stay oblivious of the changes of the mode of operation.

Figure 6:
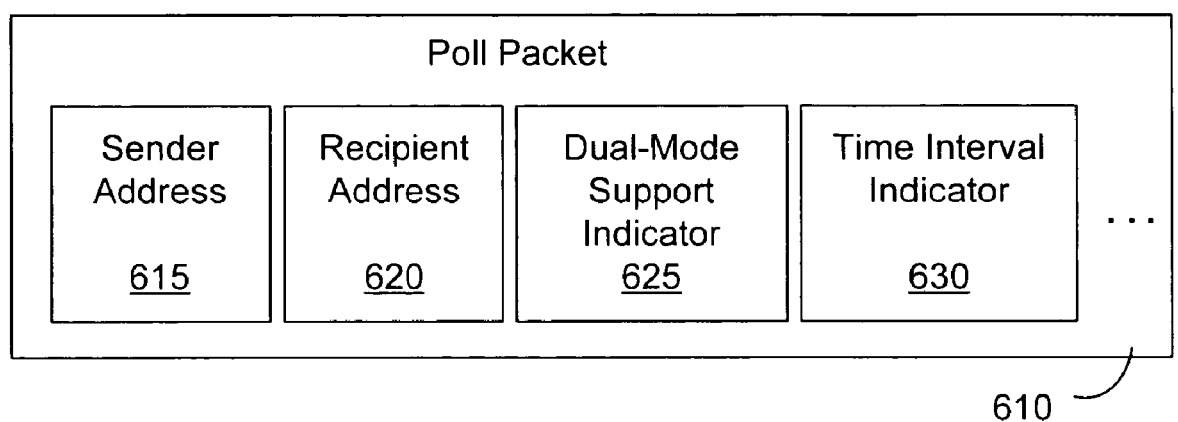
FIG. 6 is a schematic diagram showing the data structure of a poll signal used to cause mode switching of the dual-mode node.

FIG. 6 illustrates an exemplary poll packet 610 suitable for directing a mode switch at a dual-mode device's networking stack. In the poll packet 610, a sender address field 615 identifies the node from which it originated, which in the shown embodiment is the access point 215. A recipient address field 630 contains the Media Access Control ("MAC") address of the intended recipient of the poll signal. Whether the poll signal packet is intended for an IS node or the AH nodes is indicated by the mode identified in the poll signal (625). If the recipient address is the address of an IS node, then the packet is a poll signal intended for that particular IS node. An AH poll signal is intended for all the AH nodes and therefore has the broadcast MAC address.

In addition, the poll packet preferably includes a sub-field in dual mode support indicator field 625 to indicate whether the access point supports management of dual mode wireless devices. The poll packet includes an optional time interval indication 630 specifying the time interval for which the mode switch is to be made at the dual-mode wireless device's networking stack.

Continuing the example provided earlier in the Background Section, with the dual-mode operation enabled by the invention, employees from company A conducting the business meeting with employees from company B can share electronic information such as documents, presentations, and data with their hosts without being allowed access to the host's internal network. The host, i.e. company B's employee, can maintain the connection of his computer to the internal network of company via IS wireless links during the meeting. At the same time, functioning as a dual-mode device, the computer of company B's employee can communicate with the computers of company A's employees in the ad-hoc mode over wireless links to share electronic information with the visitors without disconnecting and logging off from the corporate network.

In view of the many possible embodiments to which the principles of this invention may be applied, it should be recognized that the embodiment described herein with respect to the drawing figures is meant to be illustrative only and should not be taken as limiting the scope of invention. For example, although the embodiment invention discussed above involves disjoint AH and IS networks, the principles implied in the invention are applicable generically to any two or more networks that are disjoint. Also, those of ordinary skill in the art will recognize that elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A computer network system comprising:
 an infrastructure wireless network having an access point and transmitting over a frequency channel;
 an ad hoc wireless network within a range of the infrastructure wireless network and transmitting over the same frequency channel as the infrastructure wireless network; and
 a wireless device concurrently participating in the infrastructure wireless network and the ad hoc wireless network, the wireless device being programmed to switch between a plurality of operation modes comprising:
  an infrastructure operation mode for communicating with nodes in the infrastructure network though the access point; and
  an ad hoc operation mode for communicating with nodes in the ad hoc wireless network, wherein the wireless device has a device stack having exposed therein a plurality of virtual network adapters, the plurality of virtual network adapters comprising:
  a first virtual network adapter for the infrastructure operation mode;
  a second virtual network adapter for the ad hoc operation mode; and
  a wireless controller driver controlling and comprising the first virtual network adapter and the second virtual network adapter.

2. A computer network system as in claim 1, wherein the frequency channel is a radio frequency channel.

3. A computer network system as in claim 1, wherein the access point transmits poll signals for coordinating bandwidth usage of the frequency channel used by the infrastructure and ad hoc networks for wireless transmissions.

4. A computer network system as in claim 1, wherein the access point transmits a plurality of kinds of poll signal, the plurality of kinds of poll signal comprising:
  a first kind of poll signal that is unicast; and
  a second kind of poll signal that is broadcast.

5. A computer network system as in claim 1, wherein the switching between the plurality of operation modes is transparent to at least the networking layer of an operating system of the wireless device.

6. A computer network system as in claim 1, wherein the wireless device includes a plurality of queues for queuing communication packets for transmission, the plurality of queues comprising:
  a first queue for queuing communication packets for transmission in the infrastructure operation mode; and
  a second queue for queuing communication packets for transmission in the ad hoc operation mode.

7. The computer network system of claim 6, wherein the communication packets are sent based on at least a transmission rate.

8. The computer network system of claim 1, wherein the wireless controller driver is implemented in an architecture of a Windows operating system.

9. The computer network system of claim 1, wherein at least a first status of the first virtual network adapter and at least a second status of the second virtual network adapter are sent to a packet scheduler by the wireless controller driver.

10. The computer network system of claim 1, wherein the first virtual network adapter can be configured with at least one user-input.

11. A computer network system comprising:
  an infrastructure wireless network having an access point and transmitting over a frequency channel;
  an ad hoc wireless network within a range of the infrastructure wireless network and transmitting over the same frequency channel as the infrastructure wireless network; and
  a wireless device concurrently participating in the infrastructure wireless network and the ad hoc wireless network, the wireless device being programmed to switch between a plurality of operation modes comprising:
    an infrastructure operation mode for communicating with nodes in the infrastructure network though the access point; and
    an ad hoc operation mode for communicating with nodes in the ad hoc wireless network,
  wherein the access point transmits a plurality of kinds of poll signal, the plurality of kinds of poll signal comprising:
    a first kind of poll signal in response to which the wireless device switches to the infrastructure operation mode; and
    a second kind of poll signal in response to which the wireless device switches to the ad hoc operation mode.

12. The computer network system of claim 11, wherein the first kind of poll signal is unicast and the second kind of poll signal is broadcast.

13. A method of operating a computer network system the computer network system comprising an infrastructure wireless network having an access point and transmitting over a frequency channel and an ad hoc wireless network within a range of the infrastructure wireless network and transmitting over the same frequency channel as the infrastructure wireless network, the method comprising:
  operating the wireless device to concurrently participate in the infrastructure wireless network and the ad hoc wireless network by switching between an infrastructure operation mode for communicating over the frequency channel with nodes in the infrastructure network though the access point and an ad hoc operation mode for communicating over the frequency channel with nodes in the ad hoc wireless network;
  transmitting from the access point a first kind of poll signal that is transmitted to at least one node in the infrastructure wireless network and a second kind of poll signal that is transmitted to at least one node in the ad hoc wireless network.

14. The method of claim 13, wherein transmitting the first kind of poll signal and the second kind of poll signal comprises coordinating bandwidth usage of the frequency channel used by the infrastructure and ad hoc networks for wireless transmissions.

15. The method of claim 14, wherein transmitting the first kind of poll signal comprises unicast and transmitting the second kind of poll signal comprises broadcast.

16. The method of claim 13, wherein switching between the infrastructure operation mode and the ad-hoc operation mode is controlled by at least a wireless controller driver.

17. The method of claim 16, wherein implementing the wireless controller driver comprises utilizing a Windows operating system.

18. The method of claim 13, wherein configuring a first virtual network adapter for the infrastructure operation mode comprises acquiring at least one user-input.

* * * * *